United States Patent
Huang

(10) Patent No.: US 9,477,652 B2
(45) Date of Patent: Oct. 25, 2016

(54) MACHINE LEARNING DIALECT IDENTIFICATION

(71) Applicant: Facebook, Inc., Menlo Park, CA (US)

(72) Inventor: Fei Huang, Boonton, NJ (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/621,921

(22) Filed: Feb. 13, 2015

(65) Prior Publication Data

US 2016/0239476 A1    Aug. 18, 2016

(51) Int. Cl.
| | | |
|---|---|---|
| G06F 17/20 | (2006.01) | |
| G06F 17/27 | (2006.01) | |
| G06F 17/21 | (2006.01) | |
| G06F 17/28 | (2006.01) | |
| G10L 15/00 | (2013.01) | |
| G10L 15/26 | (2006.01) | |

(52) U.S. Cl.
CPC ............. *G06F 17/275* (2013.01); *G06F 17/28* (2013.01); *G10L 15/005* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 8,145,484 B2 | 3/2012 | Zweig | |
| 8,990,068 B2 * | 3/2015 | Orsini | G06F 17/2854 704/2 |
| 8,996,352 B2 * | 3/2015 | Orsini | G06F 17/2854 434/157 |
| 8,996,353 B2 * | 3/2015 | Orsini | G06F 17/289 704/10 |
| 8,996,355 B2 * | 3/2015 | Orsini | G06F 17/289 704/2 |
| 9,031,829 B2 * | 5/2015 | Leydon | G06F 17/28 434/156 |
| 9,231,898 B2 * | 1/2016 | Orsini | H04L 51/12 |
| 9,245,278 B2 * | 1/2016 | Orsini | G06F 17/2854 |
| 9,336,206 B1 * | 5/2016 | Orsini | G06F 17/2854 |
| 2007/0136222 A1 * | 6/2007 | Horvitz | G06N 5/04 706/45 |
| 2010/0121639 A1 | 5/2010 | Zweig | |
| 2012/0029910 A1 | 2/2012 | Medlock et al. | |
| 2012/0035915 A1 * | 2/2012 | Kitade | G10L 15/197 704/9 |
| 2012/0109649 A1 * | 5/2012 | Talwar | G10L 15/08 704/236 |
| 2014/0006929 A1 * | 1/2014 | Swartz | G06F 3/0237 715/234 |
| 2014/0280592 A1 | 9/2014 | Zafarani et al. | |
| 2014/0335483 A1 | 11/2014 | Buryak et al. | |
| 2015/0161104 A1 | 6/2015 | Buryak et al. | |

(Continued)

OTHER PUBLICATIONS

Non-Final Office Action mailed Dec. 17, 2015, for U.S. Appl. No. 14/302,032 of Saint Cyr, L., filed Jun. 11, 2014.

(Continued)

*Primary Examiner* — Satwant Singh
(74) *Attorney, Agent, or Firm* — Perkins Coie LLP

(57) ABSTRACT

Technology is disclosed for creating and tuning classifiers for language dialects and for generating dialect-specific language modules. A computing device can receive an initial training data set as a current training data set. The selection process for the initial training data set can be achieved by receiving one or more initial content items, establishing dialect parameters of each of the initial content items, and sorting each of the initial content items into one or more dialect groups based on the established dialect parameters. The computing device can generate, based on the initial training data set, a dialect classifier configured to detect language dialects of content items to be classified. The computing device can augment the current training data set with additional training data by applying the dialect classifier to candidate content items. The computing device can then update the dialect classifier based on the augmented current training data set.

21 Claims, 6 Drawing Sheets

(56) References Cited

U.S. PATENT DOCUMENTS

| | | |
|---|---|---|
| 2015/0161114 A1 | 6/2015 | Buryak et al. |
| 2015/0161227 A1 | 6/2015 | Buryak et al. |
| 2015/0213008 A1* | 7/2015 | Orsini .................... G06F 17/28 704/2 |
| 2015/0363388 A1 | 12/2015 | Herdagdelen et al. |
| 2016/0162477 A1* | 6/2016 | Orsini .................... H04L 51/12 704/2 |
| 2016/0162575 A1 | 6/2016 | Eck et al. |
| 2016/0188576 A1 | 6/2016 | Huang et al. |

OTHER PUBLICATIONS

U.S. Appl. No. 14/302,032 of Herdagdelen, A. et al., filed Jun. 11, 2014.
U.S. Appl. No. 14/559,540 of Eck, M. et al., filed Dec. 3, 2014.
U.S. Appl. No. 14/586,022 of Huang, F. et al., filed Dec. 30, 2014.
U.S. Appl. No. 14/967,897 of Huang F. et al., filed Dec. 14, 2015.
U.S. Appl. No. 14/980,654 of Pino, J. et al., filed Dec. 28, 2015.
Final Office Action mailed Jul. 1, 2016, for U.S. Appl. No. 14/302,032 of Herdagdelen, A., filed Jun. 11, 2014.
U.S. Appl. No. 15/199,890 of Zhang, Y. et al., filed Jun. 30, 2016.
U.S. Appl. No. 15/244,179 of Zhang, Y., et al., filed Aug. 23, 2016.

* cited by examiner

MACHINE LEARNING DIALECT IDENTIFICATION

BACKGROUND

The Internet has made it possible for people to connect and share information globally in ways previously undreamt of. Social media platforms, for example, enable people on opposite sides of the world to collaborate on ideas, discuss current events, or share what they had for lunch. In the past, this spectacular resource has been somewhat limited to communications between users having a common natural language ("language"). In addition, users have only been able to consume content that is in their language, or for which a content provider is able to determine an appropriate classification or translation.

While communication across the many different languages used around the world is a particular challenge, several types of language modules, such as language classifiers, language models, and machine translation engines, have been created to address this concern. These language modules enable "content items," which can be any item containing language including text, images, audio, video, or other multi-media, to be quickly classified, translated, sorted, read aloud, and otherwise used based on the semantics of the content item. Language modules can be created using "training data," which is data with a classification that can be compared to other data to assign additional classifications. Training data is often obtained from news reports, parliament domains, educational "wiki" sources, etc. where language classifications are assigned. In many cases, sources of the training data do not account for differences in dialect used within particular languages. For example, traditional speech recognition and machine translation systems for Arabic focus on Modern Standard Arabic (MSA), and do not account for other Arabic dialects, which can differ from MSA lexically, syntactically, morphologically, and phonologically. Such speech recognition and machine translation systems are not able to adequately recognize or translate content items to or from non-MSA dialects.

DETAILED DESCRIPTION

Figure 1:
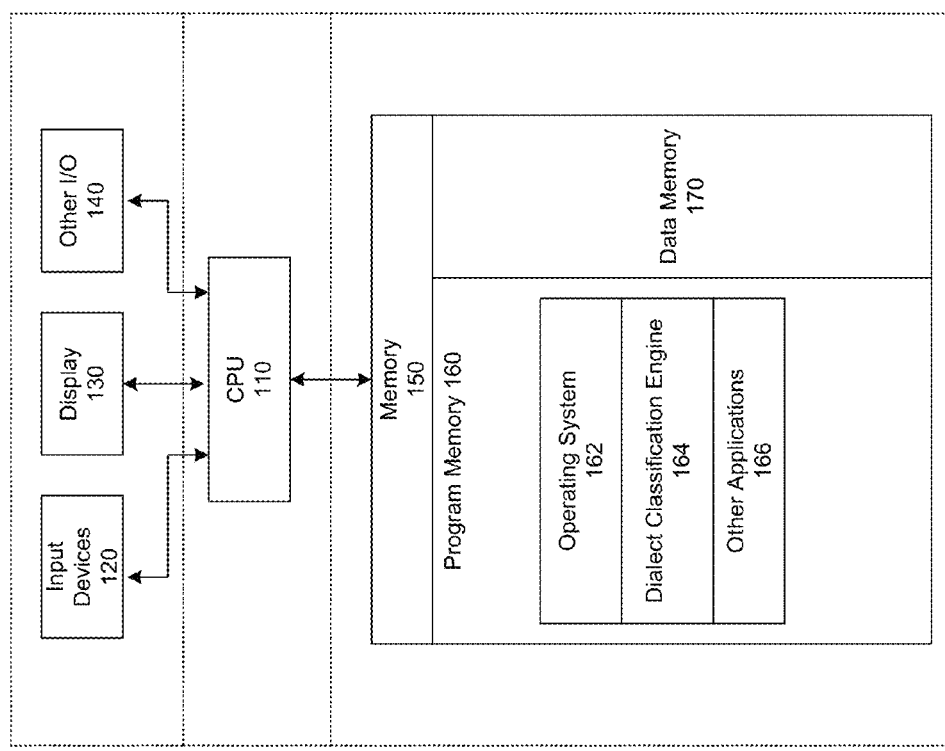
FIG. 1 is a block diagram illustrating an overview of devices on which some implementations of the disclosed technology can operate.

Language dialect technology is disclosed that creates and tunes classifiers for language dialects and generates dialect-specific language modules. The language dialect technology can obtain initial bootstrap training data and build a dialect classification engine (e.g., a neural network or other classifier technologies) for a selected dialect based on the initial bootstrap training data. The language dialect technology can iteratively apply the dialect classification engine to content items and thereby identify additional training data for the selected dialect. The additional training data can be used to update the dialect classification engine to improve its classification capabilities. The updated dialect classification engine can also identify misclassified content items that are not in the selected dialect using the improved classification capabilities of the updated dialect classification engine, such that misclassified content items can be removed from the training data creating improved training data. A "content item" can be any item containing language including text, images, audio, video, or other multi-media. As examples, a content item can be anything used in a social media site such as a wall post, comment, status update, message, fan post, news story, event, etc. In some implementations, the language dialect technology can use either or both of the visual data and the audio data.

The language dialect technology can further update the dialect classification engine with the improved training data. Removing misclassified content items and updating the dialect classification engine can be repeated iteratively until no additional misclassified content items are found. The language dialect technology can use the resulting dialect classification engine or training data to create language modules, including machine translation engines, speech recognition systems, language classifiers, and language models, each of which account for differences in dialects. For example, variants of the same language (e.g., American English versus British English), can use different meanings of the same word, non-standard phrases (e.g., slang), etc. The word "lift," for example, can mean "move upward" among speakers of American English (as that word is commonly used in America), whereas it can mean "elevator" in content items created by English speakers with a British dialect. Depending on the dialect classification assigned to a content item by a dialect classification component, the phrase, "press the button for the lift," can be translated into an equivalent of either "press the button for the elevator" or "press the button to go up."

Language dialect technology can obtain initial bootstrap data in various ways. For example, "crowd-sourcing" through social media or publicly available classification data can be used to identify content items that are in a particular language dialect; dialect classifications can be obtained by examining content items' author location or author dialect, e.g., identified user city, state or country, specified language dialects, IP information, dialect attributes of a user's social media friends, dialect attributes of group memberships, users interacting with content items with identified dialects, etc. In some implementations, the content item itself or the area to which the content item is posted can contain useful locale or language information. For example, a content item can be posted on a website that is associated with a particular dialect or location. The methods of obtaining initial bootstrap data can also be used to select additional candidate content items for the iterative training process.

The iterative training process improves the quality of dialect classification engines. In some implementations, the iterative training process ends when there is no more additional training data to be discovered by the classification engine. In some implementations, the iterative training process ends when the number of content items by which the dialect classification engine has been trained exceeds a threshold number. In some implementations, the iterative training process ends when a confidence level attributed to the dialect classification engine exceeds a threshold level.

After the iterative training process, the set of training data and/or the completed dialect classification engine can be used to build a language module for various purposes. For example, the language dialect technology can build a language model for speech recognition. An audio signal and the language model can be supplied to a speech recognition engine to generate a textual transcript for the audio signal in a particular dialect. As a further example, the language module can be a machine translation engine using a dialect-specific language model. A machine translation engine can use the dialect-specific language model to translate a content item from English to a particular dialect of Arabic. The dialect-specific language model can help determine the language rules for generating textual data in that particular dialect of Arabic. As a further example, a machine translation engine can use a dialect classification engine to identify a source dialect for a content item to be translated into another language. Once the dialect is identified, the machine translation engine can properly translate the content item from the dialect to another dialect or another language.

Several implementations of the described technology are discussed below in more detail in reference to the figures. FIG. 1 is a block diagram illustrating an overview of devices 100 on which some implementations of the disclosed technology may operate. The devices can comprise hardware components of a device 100 that creates and tunes classifiers for language dialects and generates dialect-specific language modules. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, dialect classification engine 164, and any other application programs 166. Memory 150 also includes data memory 170 that can include, e.g., training data used by the dialect classification engine 164, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
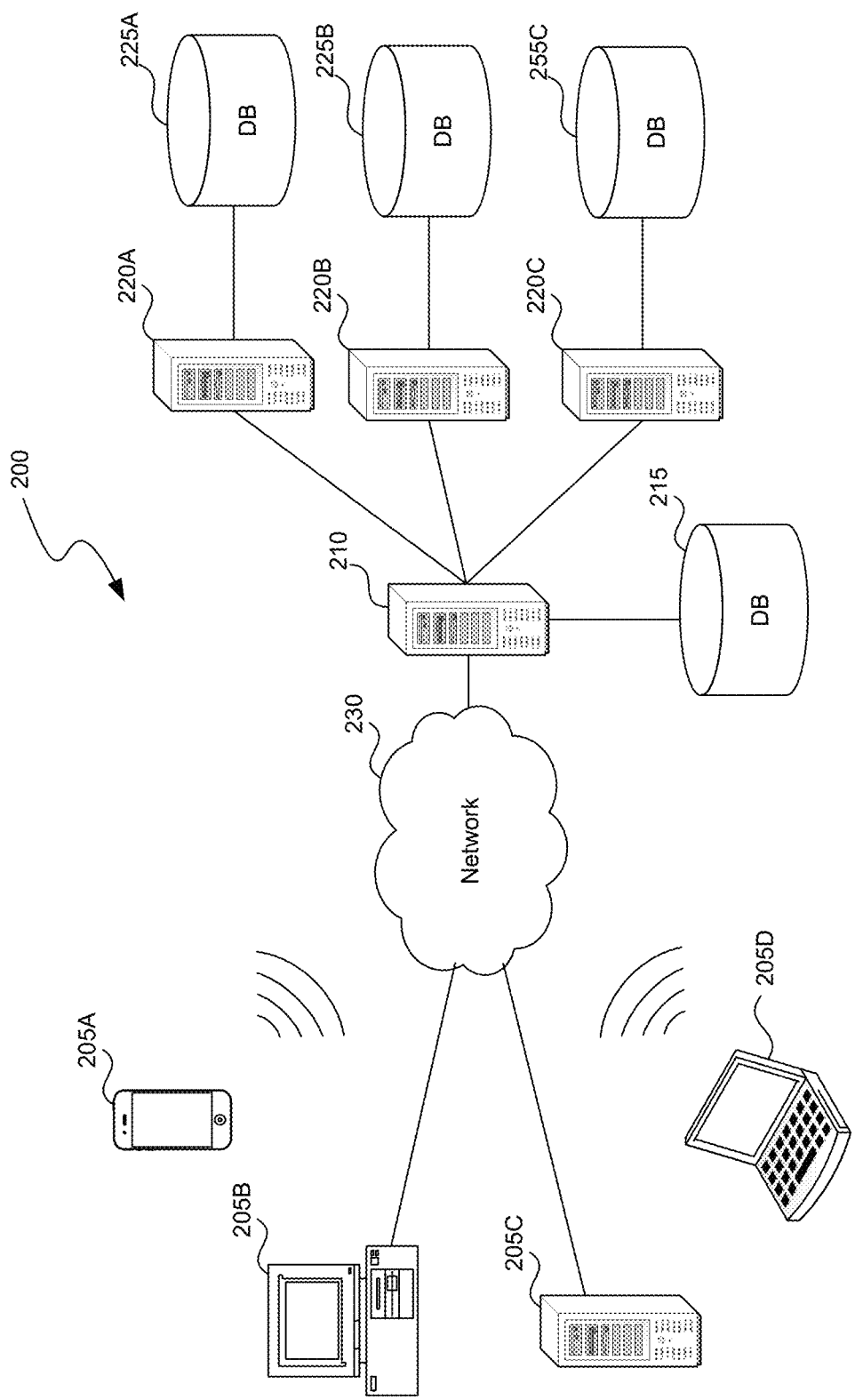
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as training data, content items, dialect identification information, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
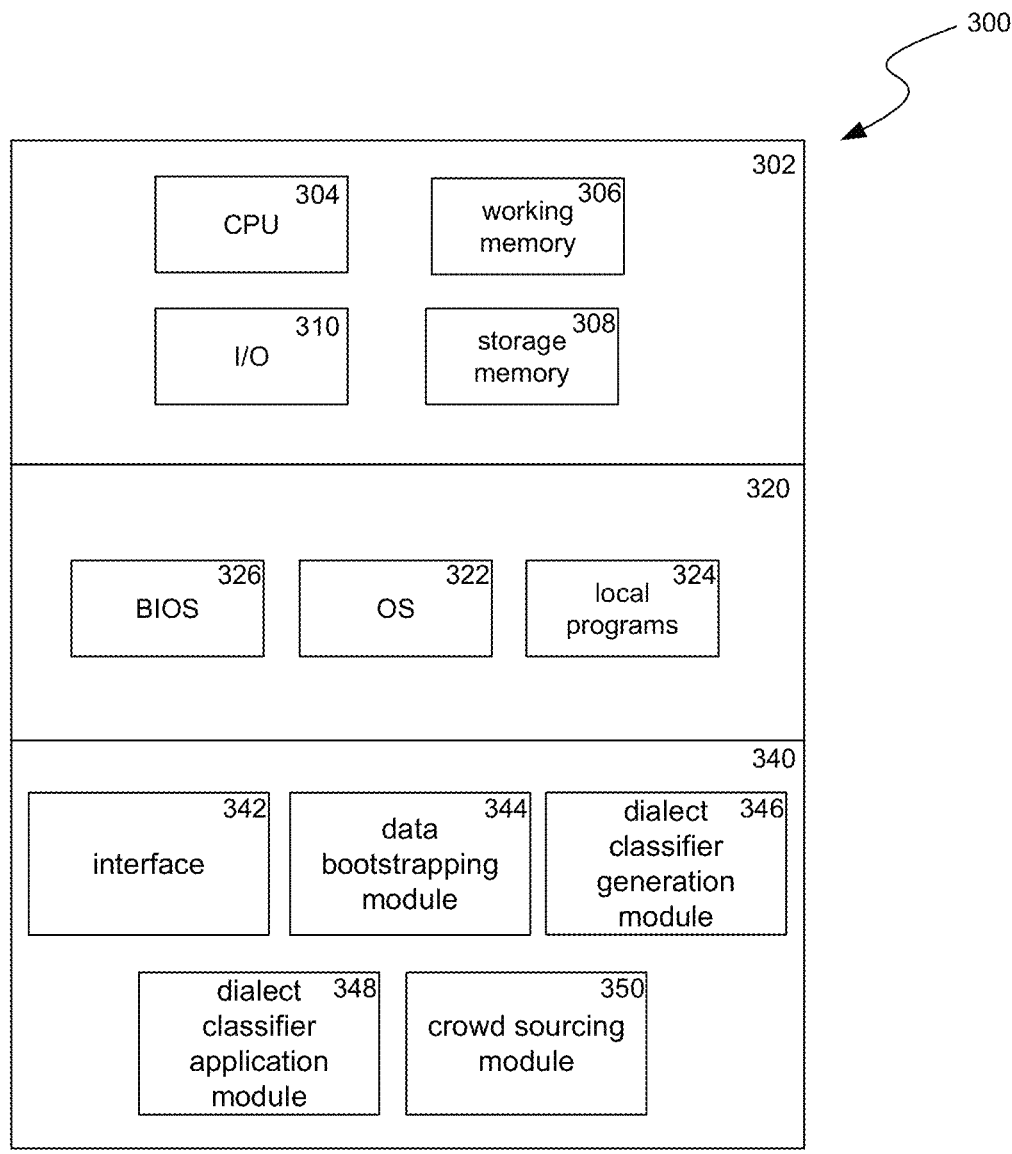
FIG. 3 is a block diagram illustrating components which, in some implementations, can be used in a system employing the disclosed technology.

FIG. 3 is a block diagram illustrating components 300 which, in some implementations, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include components which can be used for controlling and receiving data from the specialized components, such as interface 342, and a data bootstrapping module 344, a dialect classifier generation module 346, a dialect classifier application module 348 and a crowd sourcing module 350.

The data bootstrapping module 344 can select an initial training data set as a current training data set by receiving one or more initial content items, establish dialect parameters for one or more of the initial content items, and sort the initial content items into one or more dialect groups based on the established dialect parameters.

The data bootstrapping module 344 can implement various procedures to establish the dialect parameters. The data bootstrapping module 344 can identify content items associated with one or more specified locations identified as correlated to a dialect. For example, a web post is associated with a particular Arabic country, the web post can be identified as in the particular Arabic dialect used in that country. The data bootstrapping module 344 can identify content items authored by one or more users identified as correlated to the dialect. For example, if an online article is authored by a user who has been identified as using a particular dialect, the data bootstrapping module 344 can determine that the online article is likely in that dialect.

The data bootstrapping module 344 can identify content items that use one or more n-grams, n-gram types, or word endings correlated to the dialect. An n-gram is a contiguous sequence of n items from a given sequence of text or speech. The items can be, e.g., phonemes, syllables, letters, words or base pairs. The data bootstrapping module 344 can identify content items that use punctuation or grammar in a manner correlated to a dialect. The data bootstrapping module 344 can identify spelling of words in the content items that are distinctive for a language dialect. For example, if an online post uses a particular word ending, punctuation, grammar, or word spelling that is unique for a dialect, the data bootstrapping module 344 can determine that the online post is in that dialect.

The data bootstrapping module 344 can identify content items that are correlated to the dialect based on user interaction with the content items. For example, if an online article is rated by users that are known using Arabic, the data bootstrapping module 344 can determine that the online article is in that dialect.

The dialect classifier generation module 346 can generate a dialect classifier based on the initial training data set. This can occur, for example, by training a classifier such as a neural network or support vector machine. The dialect classifier can detect content item language dialects.

The dialect classifier application module 348 can alter the current training data set with additional training data by applying the dialect classifier to additional candidate content items. In addition, the classifier application module 348 can apply the dialect classifier to items in the current training data set to identify items that have an incorrect dialect classification. The current training data set can be altered to remove misclassified content items. The altered current training data set can be used by dialect classifier generation module 346 to update the dialect classifier.

The crowd sourcing module 350 can generate user inquiries regarding the dialect of the content items. Based on the results of the user inquiries, the crowd sourcing module 350 can augment the current training data set based on results of the user inquiries, such that the classifier can be improved using the augmented training data set.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
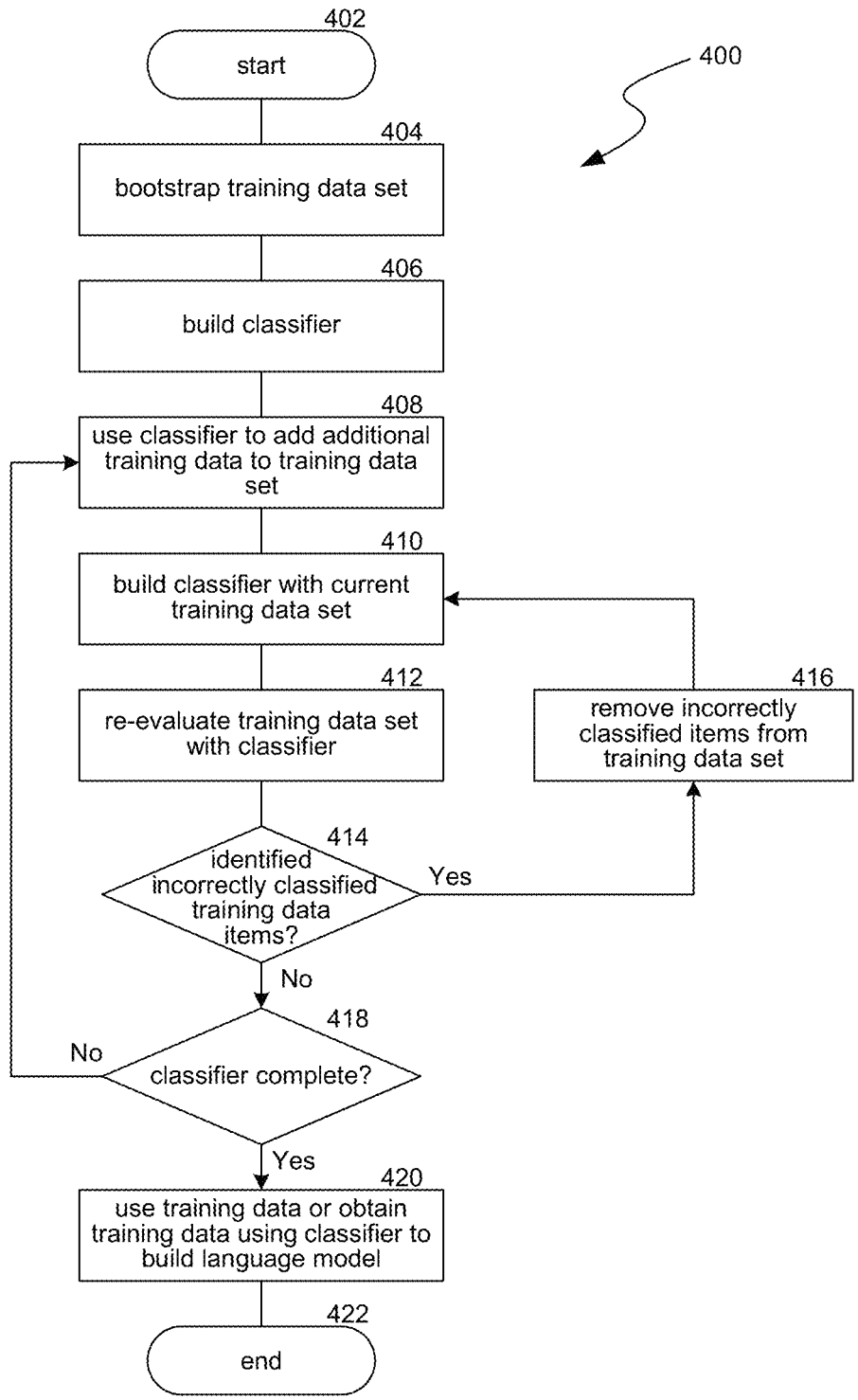
FIG. 4 is a flow diagram illustrating a process used in some implementations for creating and tuning a dialect classification engine.

FIG. 4 is a flow diagram illustrating a process 400 used in some implementations for creating and tuning a dialect classification engine. The process 400 identifies the language dialect in the content items, and uses the content items as training data to tune a particular dialect classification engine for the dialect. With the training using the content items, the dialect classification engine has a better capability to identify the dialect in additional content items.

Figure 5:
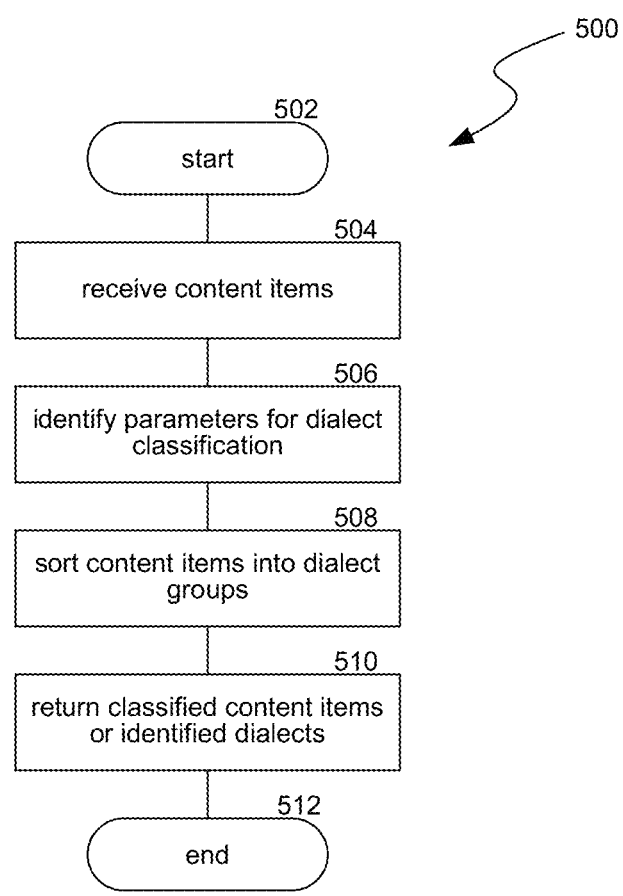
FIG. 5 is a flow diagram illustrating a process used in some implementations for bootstrapping initial training data set.

At block 404, the process 400 bootstraps (i.e., identifies and retrieves) an initial training data set based on various characteristics of candidate content items. FIG. 5 discloses the bootstrapping process in further detail. The initial bootstrap data can be obtained in various ways. For example, crowd-sourcing through social media or publicly available classification data can be used to identify the content items that are in a particular language dialect. The system can identify content items in particular dialects by examining author data, content items' data, and/or metadata, e.g., user specified city, state or country, user profile including language dialect information, social media friends, group memberships, users interacting with content items posted by authors, users interacting with the author, age, IP information, etc. This data or metadata can indicate a location of the author or dialect used by the author in the content items. The content item itself or the area to which the content item is posted can also contain useful locale or language information. For example, a content item can be posted on a website that is associated with a particular dialect or location.

Once the initial training data set is available, at block 406, the process 400 builds the classification engine (also referred to as the classifier) using the initial training data set. For example, the classifier can be a linear classifier that assigns a score based on a vector of weights. The values of the weights are determined (trained) using the initial training data set as the input vector. Similarly, if the classifier is a logistic regression model, the initial training data set can be used to fit the model by variable selection and/or parameter estimation.

Blocks 408-418 demonstrate an iterative process for making a better and more useful classifier by identifying additional training data using the classification engine, updating the classification engine using the newly identified additional training data, and removing incorrectly classified content items from the training data set. At block 408, the process 400 uses the classification engine to add training data to the training data set. For example, the process 400 can search a social media website to locate additional candidate content items (e.g., web posts) that are possibly written or spoken in the dialect. The process 400 uses the classification engine to determine whether the additional candidate content items are in the dialect. The process 400 adds the additional candidate content items which are confirmed by the classification engine to the training data set.

The process 400 continues to block 410 to build the classification engine using the current training data set including the newly added content items. In some implementations, the process 400 rebuilds the classification engine completely using the current training data set. In some other implementations, the process 400 updates the classification engine by additional training using the newly added content items.

After the classification engine is updated, at block 412, the process 400 uses the updated classification engine to re-evaluate the content items in the training data set. The updated classification engine has a better chance to identify the misclassified content items that have been wrongly labeled as written or spoken in the dialect. At decision block 414, the process 400 determines whether the classification engine has identified any incorrectly classified training data items. If there are incorrectly classified training data items, at block 416, the process removes the incorrectly classified items from the training data set. Then the process 400 goes back to block 410 to again build the classification engine with the current training data set without the incorrectly classified items. The process of blocks 410, 412, 414 and 416 can be performed iteratively until there are no more incorrectly classified training data.

If the process 400 determines there are no more incorrectly classified training data items identified by the current classification engine, the process 400 proceeds to decision block 418 to determine whether the training of the classification engine is complete. The condition to determine a complete classifier can vary across implementations. In some implementations, the process 400 determines the classifier is complete when the number of content items by which the dialect classification engine has been trained exceeds a threshold number. In some implementations, the process 400 determines the classifier is complete when a confidence level attributed to the dialect classification engine exceeds a threshold level. A high confidence level suggests that the dialect classification accuracy of the classifier is high. In some implementations, the process 400 determines the classifier is complete when the classifier is able to classify a pre-determined test data set with a success rate higher than a threshold level.

If the process 400 determines that the classifier is not complete, the process 400 goes back to block 408 to use the classifier to add more training data to the training data set. If the process 400 determines that the classifier is complete, the process 400 can proceed to block 420 to use the training data or obtain training data using the classifier to build a language model. In some implementations, the goal of the process 400 is to build the classification engine instead of a language model. In these implementations, the process 400 can end immediately after the classifier is complete.

A language model can be used, for example, in speech recognition technologies. A speech recognition engine can receive acoustic signals as inputs and use a language model to recognize the content of the acoustic signals and to generate a textual transcript for the acoustic signals in a particular dialect.

The language model can also be used for machine translation technologies. For example, a machine translation engine can use a dialect-specific language model to translate a content item from English to a particular dialect of Arabic. The dialect-specific language model can help determine the language rules for generating textual data in that particular dialect of Arabic.

As a further example, a machine translation engine can use a dialect classification engine to identify a source dialect for a content item to be translated. Then the machine translation engine can properly translate the content item from the identified dialect to another dialect or another language.

The language model can include language rules and information useful for generating text in a particular dialect. For example, the language model can determine proper word endings for certain action verbs in a certain tense in a particular dialect. The classification engine can be an algorithm for identifying the dialect of a content item. The coefficients of the algorithm (e.g., function coefficients of an artificial neural network) are trained using a training data set including content items that are in the particular dialect.

FIG. 5 is a flow diagram illustrating a process 500 used in some implementations for bootstrapping an initial training data set. At block 504, the process 500 receives content items. In some implementations, the received content items can be in the same language. The received content items can be in different dialects of the same language. For example, the process 500 can collect content items (e.g., posts and comments) from an Arabic social media website. The content items retrieved from the website can be written or spoken in different dialects of Arabic.

At block 506, the process 500 identifies parameters for dialect classification. In some implementations, the parameters can include source data, e.g. data about the context of the content item. For example, the content item may be received along with a tag indicating that the content item is from a website designed for users with a particular language dialect. The source data can also include source URL link indicating that the content item is a comment to a web article written in a language dialect. For example, the process 500 can identify particular types of spelling, punctuation, grammar, word ending, or word that are specific to the dialect. The spelling, punctuation, grammar, word ending, or words found in the content item help the process 500 to determine whether the content item is in the particular dialect. In some implementations, the process 500 can use a list of words that are common in the dialect. If the content item frequently recites these common words, there is a high probability that the content item is in that dialect. In some implementations, the process 500 can organize the words from the content item into categories.

In some implementations, the process 500 determines weight values for different parameters. For example, the process 500 may decide to assign a high weight value for a particular spelling, and to assign a low weight value for a particular grammar pattern since the grammar pattern can be found in other dialects as well. Some word endings may be dialect-specific, while some other word endings may be for dialects generally in the language. The process 500 may assign different weight values depending on whether a word ending is dialect-specific or not.

At block 508, the process 500 sorts content items into dialect groups. The process 500 can sort the content items in an open-ended fashion to group the content items into multiple categories. For example, the process 500 can group the content items based on the different word ending choices in the content items. The categories can be associated with known dialects, as well as potentially new dialects that are not recognized by the system. The group of content items that are associated with the unknown dialect may be sub-classified into multiple unknown dialects. For example, the system may be able to classify Arabic dialects including Modern Standard Arabic (MSA), Iraqi dialect, Levantine dialect, Gulf dialect and Egypt dialect. If the categorization results contain a group of content items that do not fit into any of the MSA dialect, Iraqi dialect, Levantine dialect, Gulf dialect and Egypt dialect, the system may treat the group of content items as in a sixth Arabic dialect for which the system does not yet have good training data, e.g., the Maghrebi dialect. The process of the sorting is explained in detail in FIG. 6.

In some implementations, the system can use crowd sourcing to help the process 500. The system can send the content items and classification results to users. The users can respond to confirm whether the classification is correct, or give a ranking on the accuracy of the classification. The system receives the confirmation and/or ranking from the users and tunes the bootstrapping training data by removing content items that are voted down by the users.

At block 510, the process 500 returns the classified content items or identified dialects. The process 500 can return the content items along with the grouping information. The information can be included in the bootstrapping training data to be used for building the classification engine as illustrated at block 406.

Figure 6:
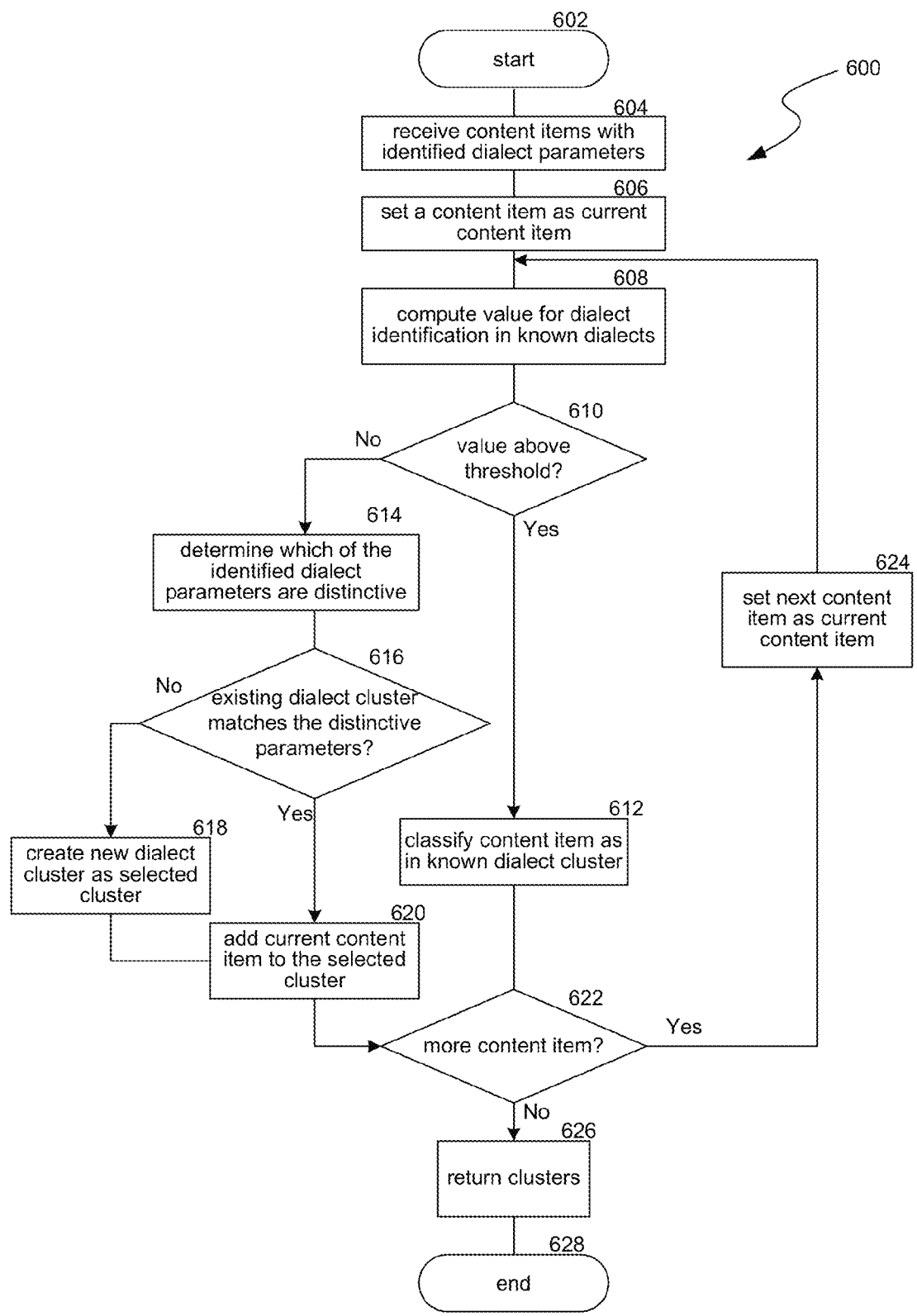
FIG. 6 is a flow diagram illustrating a process used in some implementations for grouping content items.

FIG. 6 is a flow diagram illustrating a process 600 used in some implementations for grouping content items. At block 604, the process 600 receives content items in a particular language with identified dialect parameters. The process 600 proceeds to block 606 to set a content item as the current content item.

The process 600 proceeds to block 608 to compute a value for dialect identification in known dialects for the specified language. For example, for each of the Arabic dialects, the process 600 can compute a value suggesting the possibility that the content item is in a particular Arabic dialect.

At decision block 610, the process 600 determines whether the value for dialect identification is above a threshold value. A value above the threshold value suggests that the current content item is clearly in that dialect associated with the value. If there is a value for dialect identification above the threshold value, the process 600 proceeds to block 612 to classify the current content item as in a known dialect cluster.

If there is no value for dialect identification above the threshold value, meaning the content item cannot be grouped into a particular known dialect, the process 600 proceeds to block 614 to determine if any of the identified dialect parameters are distinctive. For example, in some implementations, the content items can contain distinctive word endings or distinctive word uses that can be identified as indicative of the content item being dialect-specific, even if it is not for a known dialect.

At decision block 616, the process 600 determines whether there is an existing dialect cluster that matches the distinctive parameters. For example, a previous content item can be identified as using a specific set of word endings. The current content item can be identified as having a distinctive parameter using the same word endings. If there is an existing dialect cluster that matches the distinctive parameters, the process 600 adds the current content item to the selected dialect cluster at block 620. If there is no existing dialect cluster that matches the distinctive parameters, the process 600 creates a new dialect cluster as a selected dialect cluster at block 618.

At decision block 622, the process 600 determines whether there are more content items to be classified. If there are more content items, the process 600 proceeds to block 624 to set a next content item as the current content item, and moves back to block 618 to compute a value for dialect identification. If there are no more content items, the process 600 proceeds to block 626 to return the dialect clusters.

Several implementations of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method, comprising:
   selecting, by a computing device, an initial training data set as a current training data set, wherein the initial training data set is selected by:
   receiving one or more initial content items; and
   establishing dialect parameters for two or more of the initial content items, wherein the dialect parameters identify a first of the two or more of the initial content items as being composed in a first dialect and identify a second of the two or more of the initial content items as being composed in a second dialect;
   generating, by the computing device and based on the initial training data set and corresponding dialect parameters, a dialect classifier configured to detect language dialects of content items to be classified as being in one of two or more dialects, the two or more dialects including at least the first dialect and the second dialect;
   augmenting, by the computing device, the current training data set with additional training data by applying the dialect classifier to candidate content items, wherein at least one of the candidate content items that is in the augmented current training data set was not included in the initial training data set;
   updating the dialect classifier based on the augmented current training data set; and
   returning the updated dialect classifier, wherein the updated dialect classifier is configured to identify additional content items that are not in the initial training data and are not in the augmented current training data set as being in one of the two or more dialects.

2. The method of claim 1, wherein the establishing includes:
   identifying content items associated with one or more specified locations identified as correlated to a dialect;
   identifying content items authored by one or more users identified as correlated to the dialect;
   identifying content items that use one or more n-grams, n-gram types, or word endings correlated to the dialect;
   identifying content items that use punctuation or grammar in a manner correlated to the dialect; or
   identifying content items that are correlated to the dialect based on user interaction with the content items; and
   sorting the initial content items into one or more dialect groups based on the established dialect parameters.

3. The method of claim 1, further comprising:
   evaluating the current training data set using the dialect classifier;
   identifying incorrectly classified training data items within the current training data set;
   updating the current training data set by removing the incorrectly classified training data items from the current training data set; and
   updating the dialect classifier based on the updated current training data set.

4. The method of claim 1, further comprising:
   determining that the dialect classifier has not been completed;
   identifying additional training data by applying the dialect classifier to additional candidate content items; and
   updating the dialect classifier based on an updated version of the current training data set that includes the additional training data.

5. The method of claim 1, further comprising:
   determining a language dialect of a content item by applying the dialect classifier on the content item.

6. The method of claim 1, further comprising:
   generating a language model for the language dialect based on the current training data set.

7. The method of claim 6, further comprising:
   translating a content item into the language dialect by using the language model.

8. The method of claim 6, further comprising:
   recognizing, using the language model, a dialect of an audio portion of a content item to convert into text.

9. The method of claim 1 further comprising sorting the initial content items by:
   receiving content items with the dialect parameters;
   selecting a content item from the content items as a current content item;
   computing a value for dialect identification for the current content item; and
   classifying the current content item as in the dialect in the event that the value for dialect identification exceeds a threshold value.

10. The method of claim 9, wherein the value for dialect identification does not exceed the threshold value and the sorting further comprises:
    identifying a distinctive dialect parameter from the dialect parameter; and
    determining whether an existing dialect cluster of content items matches the distinctive dialect parameter.

11. The method of claim 10, wherein sorting the initial content items further comprises:
    in the event that no existing dialect cluster matches the distinctive dialect parameter, creating a new dialect cluster as a selected cluster;
    in the event that an existing dialect cluster matches the distinctive dialect parameter, setting the existing dialect cluster as the selected cluster; and
    adding the content item to the selected cluster.

12. The method of claim 9, wherein sorting the initial content items further comprises:
    determining whether there are additional content items;
    in the event that there are additional content items, setting a next content item from the received content items as the current content item; and
    in the event that there are no additional content items, returning the dialect clusters.

13. A non-transitory computer-readable storage medium storing instructions that, when executed by a computing system, cause the computing system to perform operations for creating a dialect-specific training data set, the operations comprising:
    selecting an initial training data set as a current training data set, wherein the initial training data set is selected by:
    receiving one or more initial content items;
    establishing dialect parameters for two or more of the initial content items, wherein the dialect parameters identify a first of the two or more of the initial content items as being composed in a first dialect and identify a second of the two or more of the initial content items as being composed in a second dialect; and sorting each of the initial content items into one or more dialect groups based on the established dialect parameters;

generating, based on the initial training data set and corresponding one or more dialect groups, a dialect classifier configured to detect language dialects of content items to be classified as being in one of two or more dialects, the two or more dialects including at least the first dialect and the second dialect;

augmenting the current training data set with additional training data by applying the dialect classifier to candidate content items, wherein at least one of the candidate content items that is in the augmented current training data set was not included in the initial training data set; and updating the dialect classifier based on the augmented current training data set; and returning the updated dialect classifier, wherein the updated dialect classifier is configured to identify additional content items that are not in the initial training data and are not in the augmented current training data set as being in one of the two or more dialects.

14. The computer-readable storage medium of claim 13, wherein establishing the dialect parameters comprises:
identifying content items associated with one or more specified locations identified as correlated to a dialect.

15. The computer-readable storage medium of claim 13, wherein establishing the dialect parameters comprises:
identifying content items authored by one or more users identified as correlated to the dialect.

16. The computer-readable storage medium of claim 13, wherein establishing the dialect parameters comprises:
identifying content items that use one or more n-grams, n-gram types, or word endings correlated to the dialect.

17. The computer-readable storage medium of claim 13, wherein establishing the dialect parameters comprises:
identifying content items that use punctuation or grammar in a manner correlated to the dialect.

18. The computer-readable storage medium of claim 13, wherein establishing the dialect parameters comprises:
identifying content items that are correlated to the dialect based on user interaction with the content items.

19. A computing device, comprising:
an interface configured to receive one or more initial content items;

a data bootstrapping module configured to select an initial training data set as a current training data set, wherein the data bootstrapping module selects the initial training data set by:
establishing dialect parameters for two or more of the initial content items, wherein the dialect parameters identify a first of the two or more of the initial content items as being composed in a first dialect and identify a second of the two or more of the initial content items as being composed in a second dialect; and sorting each of the initial content items into one or more dialect groups based on the established dialect parameters;

a dialect classifier generation module configured to generate a dialect classifier based on the initial training data set and corresponding one or more dialect groups, the dialect classifier configured to detect language dialects of content items to be classified; and a dialect classifier application module configured to augment the current training data set with additional training data by applying the dialect classifier to candidate content items, wherein at least one of the candidate content items that is in the augmented current training data set was not included in the initial training data set;

wherein the dialect classifier generation module is further configured to:
update the dialect classifier based on the augmented current training data set, and returning the updated dialect classifier, wherein the updated dialect classifier is configured to identify additional content items that are not in the initial training data and are not in the augmented current training data set as being in one of the two or more dialects.

20. The computing device of claim 19, further comprising:
a crowd sourcing module configured to generate user inquiries regarding the dialect of the content items and to augment the current training data set based on results of the user inquiries.

21. The computing device of claim 19, wherein the data bootstrapping module is configured to establish dialect parameters by identifying spelling of words in the content items that are distinctive for a language dialect.

* * * * *